United States Patent
Everhart et al.

(10) Patent No.: US 7,252,569 B2
(45) Date of Patent: Aug. 7, 2007

(54) SECURE LIFE VEST CONTAINER

(75) Inventors: Jeffrey S. Everhart, Yadkinville, NC (US); Andrew Kerman, Winston-Salem, NC (US); Michael Moraska, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 11/160,893

(22) Filed: Jul. 14, 2005

(65) Prior Publication Data

US 2007/0015422 A1    Jan. 18, 2007

(51) Int. Cl.
- B63C 9/22 (2006.01)
- B65D 77/20 (2006.01)
- B65D 101/00 (2006.01)
- B64D 25/04 (2006.01)
- A67C 7/62 (2006.01)

(52) U.S. Cl. .................. 441/80; 206/769; 206/803; 206/807; 297/188.03; 297/188.08

(58) Field of Classification Search .............. 441/80, 441/88; 206/278, 281, 459.1, 769–773, 803, 206/807; 297/188.03, 188.08, 188.12, 188.2; 224/275

See application file for complete search history.

(56) References Cited

U.S. PATENT DOCUMENTS

| | | | |
|---|---|---|---|
| 3,623,683 A | 11/1971 | Bennett | |
| 3,923,198 A | 12/1975 | Brochman | |
| 4,390,114 A * | 6/1983 | Sviatoslavsky et al. | 220/4.02 |
| 5,065,920 A | 11/1991 | Amner | |
| 5,082,702 A | 1/1992 | Alband | |
| 5,096,249 A * | 3/1992 | Hines | 296/37.15 |
| 5,188,442 A | 2/1993 | Harty et al. | |
| 5,485,976 A | 1/1996 | Creed et al. | |
| 6,082,816 A * | 7/2000 | Gottlieb et al. | 297/188.1 |
| 6,127,023 A | 10/2000 | Marbler et al. | |
| 6,519,208 B2 * | 2/2003 | DeVries | 368/10 |
| 6,523,713 B1 | 2/2003 | Helms | |
| 6,960,110 B2 * | 11/2005 | Hough | 441/80 |
| 7,077,466 B2 * | 7/2006 | Forstner et al. | 297/188.08 |
| 7,178,867 B2 * | 2/2007 | Hough | 297/188.08 |
| 2003/0215162 A1 | 11/2003 | Switlik et al. | |
| 2004/0239435 A1 | 12/2004 | Hughes et al. | |

FOREIGN PATENT DOCUMENTS

| | | |
|---|---|---|
| EP | 0 422 847 A1 | 4/1991 |
| EP | 1516826 A1 | 2/2007 |
| WO | WO 03/024794 A1 | 3/2003 |

* cited by examiner

Primary Examiner—Ajay Vasudeva
(74) Attorney, Agent, or Firm—Adams Evans P.A.

(57) ABSTRACT

A life vest container includes a hollow housing defining a storage volume adapted to receive a flotation device, the housing having an opening communicating with the storage volume. A cover is attached to the container and is moveable between a closed position in which it encloses the opening, and an open position in which the opening is accessible. Structure is provided for attaching the housing to a passenger seat, and for securing the cover in the closed position. At least a portion of the housing or the cover is sufficiently light-transmissive to allow observation of the condition of a flotation device disposed within the storage volume.

14 Claims, 5 Drawing Sheets

SECURE LIFE VEST CONTAINER

BACKGROUND OF THE INVENTION

This invention relates generally to aircraft and more particularly to a life vest container assembly for an aircraft seat unit. Commercial passenger aircraft include safety devices for use by passengers in case of a crash or ditching, for example flotation devices. Some flotation devices are simple members of buoyant material. Inflatable life vests, packed in a folded condition, are also used. Such life vests must be stored in a manner and location so that they will not be damaged during normal operations but can be easily and quickly put into use during an emergency. Accordingly, many modern aircraft seating units include a pouch or container underneath the seat cushion where the life vest is readily accessible to the passenger.

Unfortunately, life vests stored in such an easily accessible location are subject to tampering and theft. Furthermore, it is possible for terrorists to insert weapons or other illegal items into the container. Recent government regulations also require airlines to visibly inspect each life vest pouch prior to operation of the aircraft. Using prior art life vest pouch designs, this regulation requires each pouch to be opened, inspected, closed and then resealed. This requires a significant amount of man-hours to inspect each aircraft before every flight, which is an enormous financial drain for the airlines.

Accordingly, it is an object of the invention to provide a storage container for a life vest which protects the life vest until use.

It is another object of the invention to provide a storage container for a life vest which permits observation and inspection of the stored life vest and its identifying information.

It is another object of the invention to provide a storage container for a life vest which discourages tampering and theft.

BRIEF SUMMARY OF THE INVENTION

These and other objects are met by the present invention, which according to one embodiment provides a life vest container, including a hollow housing defining a storage volume adapted to receive a flotation device, the container having an opening communicating with the storage volume; and a cover attached to the container and moveable between a closed position in which it enclosing the opening, and an open position in which the opening is accessible; means for attaching the housing to a passenger seat; and means for securing the cover in the closed position. At least a portion of the housing or the cover is sufficiently light-transmissive to allow observation of the condition of a flotation device disposed within the storage volume.

According to another embodiment of the invention, the housing is a molded plastic one-piece assembly having a top wall, a bottom wall, spaced-apart side walls, and a rear wall. The top wall extends past the rear wall to define at least one rear mounting tab having an opening therethrough. At least one front mounting boss having a hole therethrough extends upwards from the top wall.

According to another embodiment of the invention, the cover includes a rearwardly-extending tongue which overlies the top wall in the closed position.

According to another embodiment of the invention, one of the housing and the tongue includes a locking slot formed therethrough; and the other of the housing and the tongue includes a protruding locking boss formed therein. The locking boss is adapted to engage the locking slot to retain the cover in a closed position.

According to another embodiment of the invention, the life vest container further includes a security boss having a hole therethrough carried by the housing; and a security tab having a hole therethrough carried by the cover, wherein the second hole aligns with the first hole so as to receive a security seal therethrough.

According to another embodiment of the invention, the housing and the cover comprise transparent polycarbonate material.

According to another embodiment of the invention, the container is adapted to be mounted to a passenger seat when the cover is in the closed position.

According to another embodiment of the invention, the life vest container further includes a flotation device disposed inside of the container, the flotation device having an elongated deployment strap attached thereto; wherein the deployment strap is routed through the housing and over the tongue so as to apply an upwards and outwards force to the cover tongue when the deployment strap is pulled.

According to another embodiment of the invention, a passenger seat frame assembly includes t least two spaced-apart leg modules; paced-apart forward and aft transverse beams extending laterally between the leg modules, the beam having an external surface; and life vest container attached to the seat frame. The life vest container includes a hollow housing defining a storage volume, the container having an opening communicating with the storage volume; and cover attached to the container and moveable between a closed position in which it enclosing the opening, and an open position in which the opening is accessible. Means are provided for securing the cover in the closed position. At least a portion of the housing or the cover is sufficiently light-transmissive to allow observation of the contents of the storage volume.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
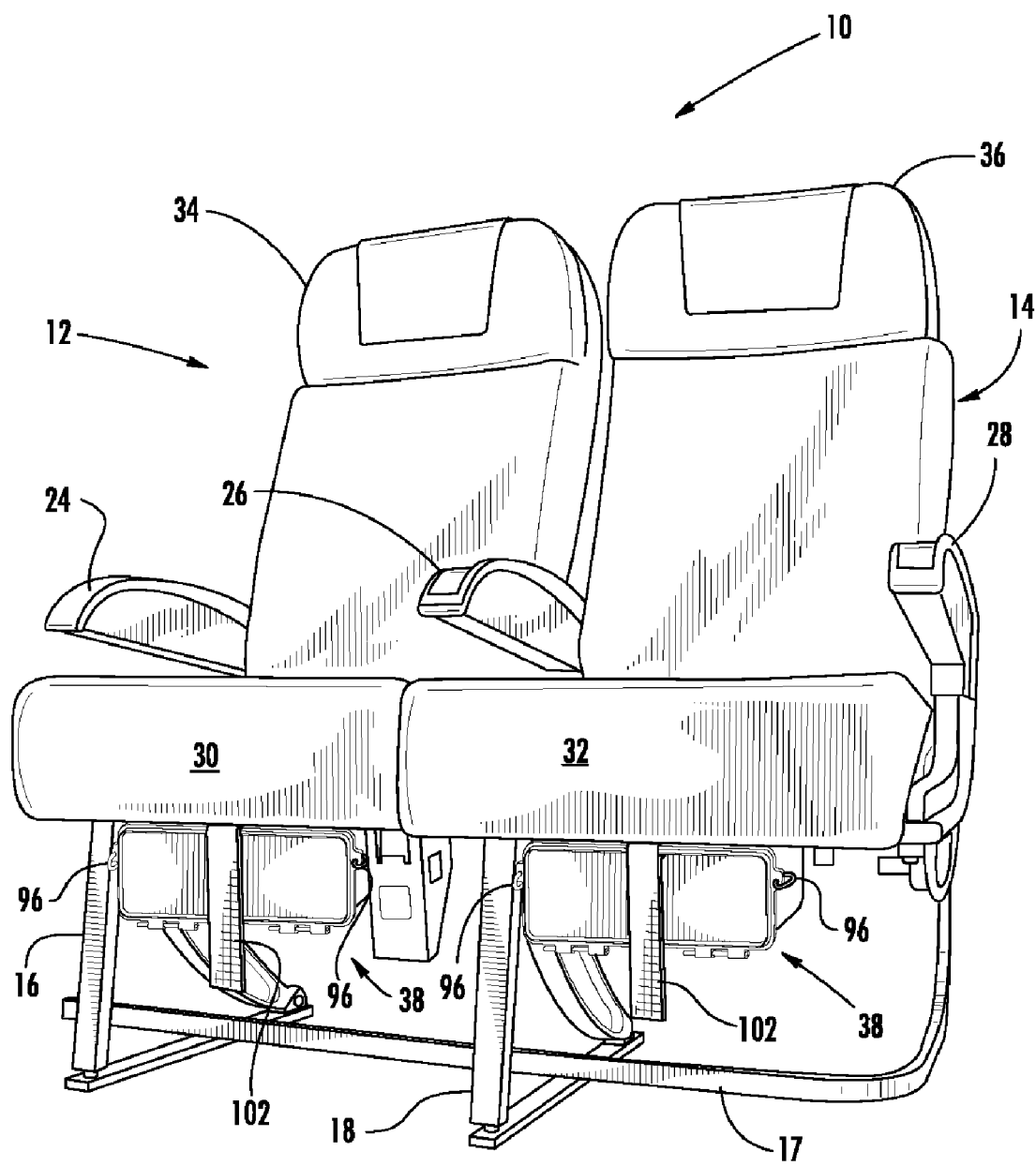
FIG. 1 is a perspective view of a seat set including a life vest container constructed in accordance with the present invention.
Figure 2:
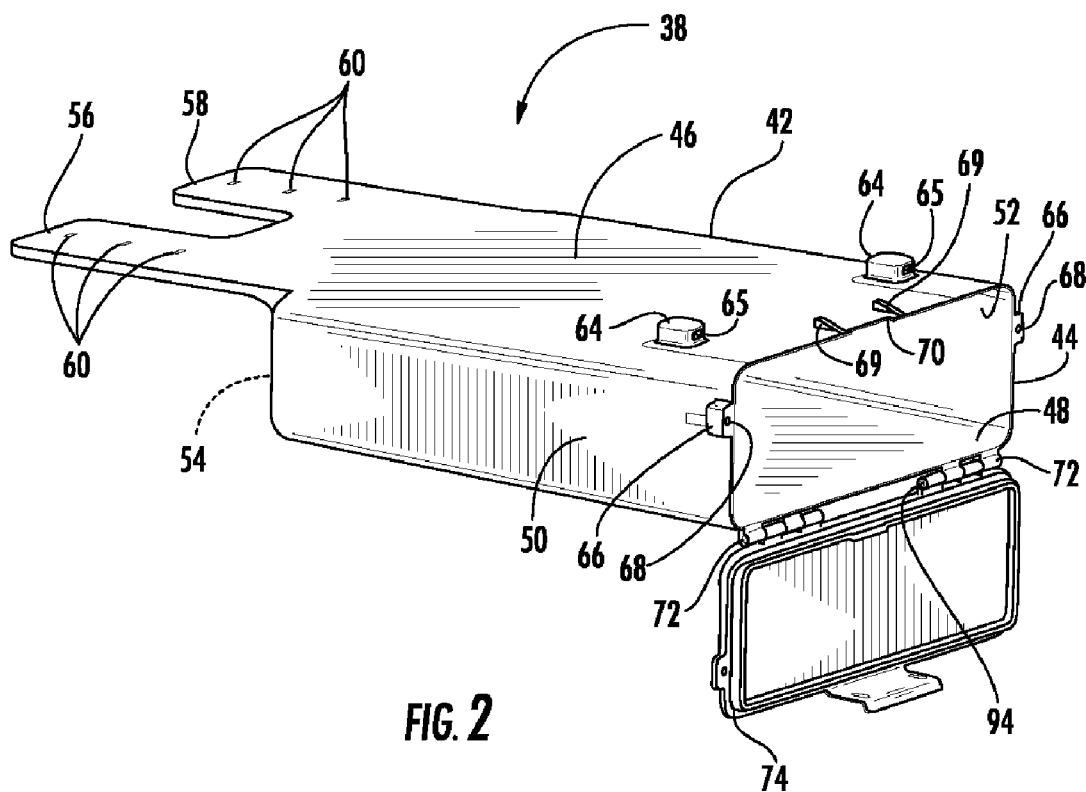
FIG. 2 is a top perspective view of a life vest container constructed according to the present invention.
Figure 3:
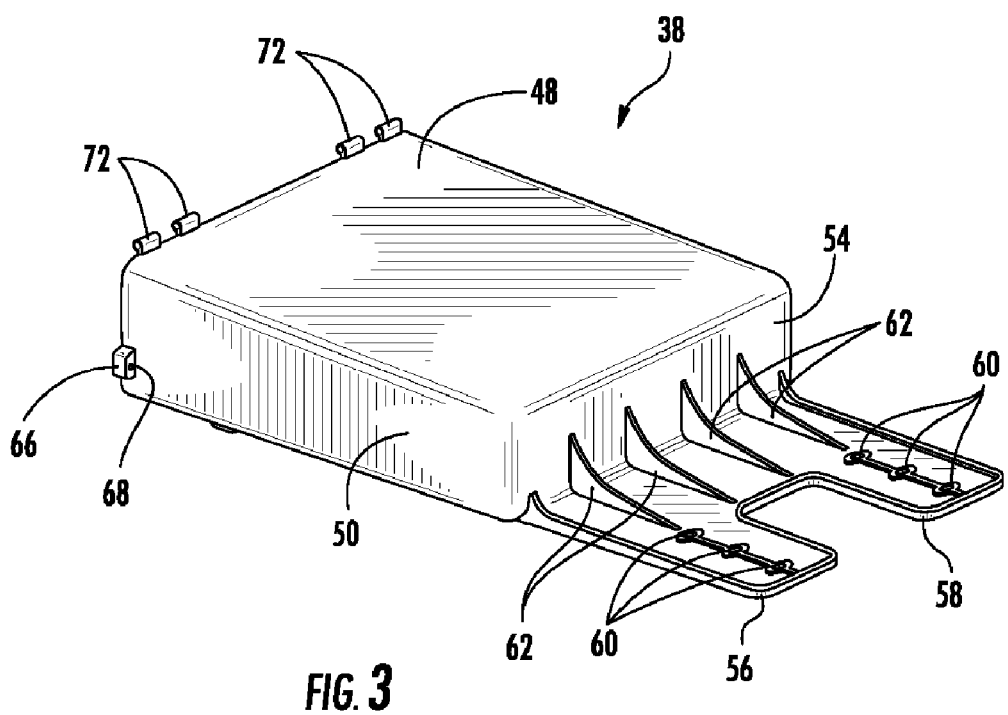
FIG. 3 is a bottom perspective view of the life vest container of FIG. 2.
Figure 4:
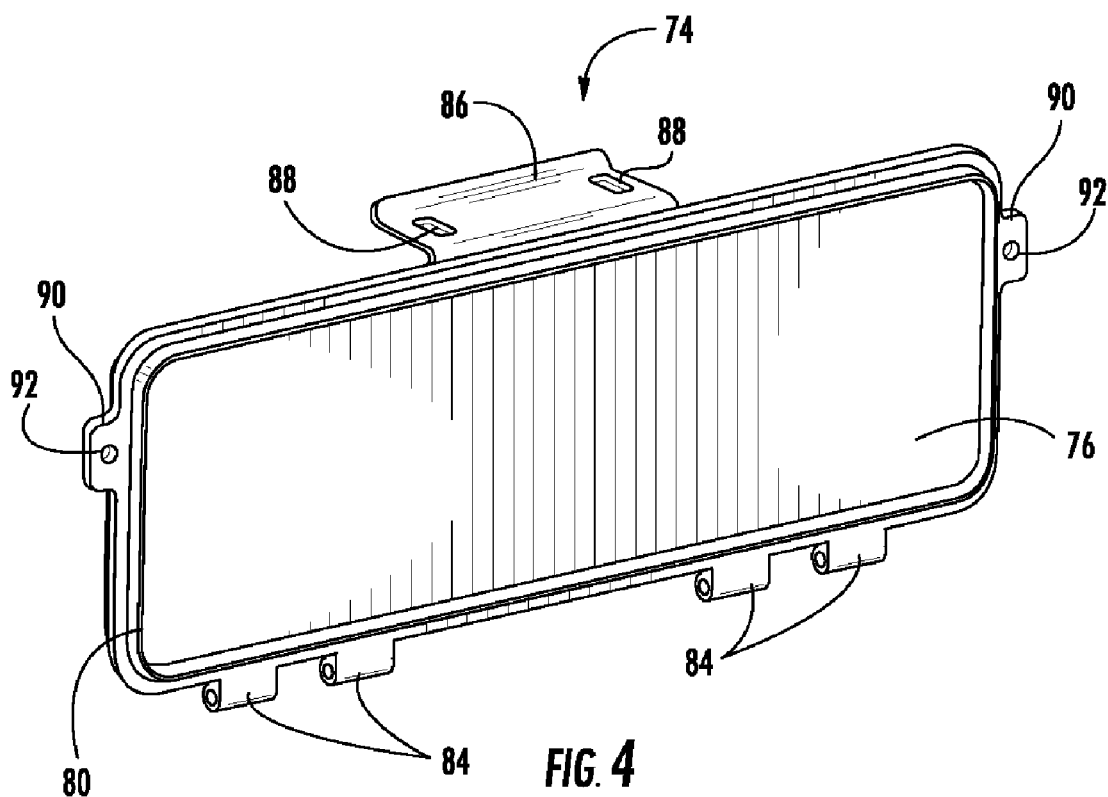
FIG. 4 is a front perspective view of a cover for the life vest container.

Referring to the drawings wherein identical reference numerals denote the same elements throughout the various views, an aircraft passenger seat set is illustrated in FIG. 1 and shown generally at reference numeral 10. In the particular embodiment shown in FIG. 1, the seat set 10 is composed of two adjacent seats, 12 and 14. The seat set 10 is supported on a pair of leg modules 16 and 18, and includes a baggage guard rail 17. The leg modules are connected by forward and aft laterally-extending transverse beams 20 and 22 (see FIGS. 6 and 7). The seats 12 and 14 are provided with arm rests 24, 26 and 28. The seats 12 and 14 include seat bottoms 30 and 32, respectively, and seat backs 34 and 36, respectively. A secure life vest container 38 is disposed under each seat 12 and 14. Each life vest container 38 encloses a life vest 40 or other type of flotation device stored in a packed condition.

Figure 5:
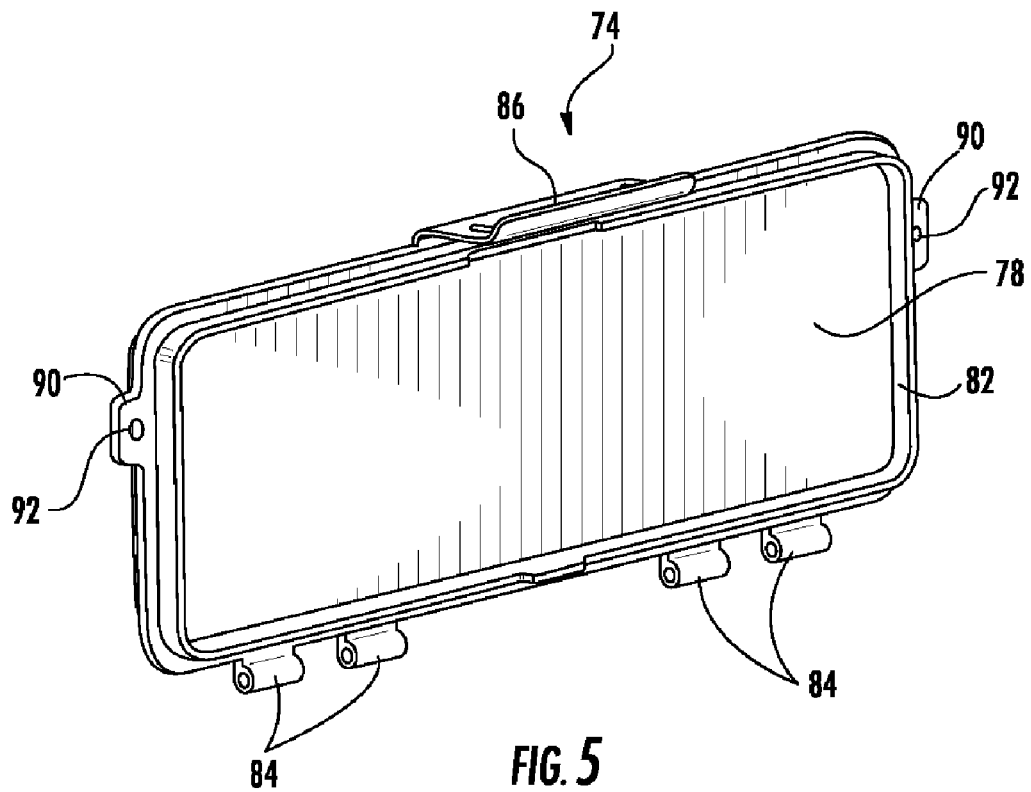
FIG. 5 is a rear perspective view of the cover of FIG. 4.

FIGS. 2 through 5 illustrate an exemplary life vest container 38 constructed in accordance with the present invention in more detail. The life vest container 38 includes a hollow housing 42 defining a storage volume and having an opening 44. The housing 42 may be formed from any lightweight, impermeable material such as plastic. One known suitable material is fire-retardant polycarbonate. Preferably, the housing 42 is transparent. The housing 42 may be formed as a unitary component, for example by vacuum molding or injection molding in a known manner. The housing 42 has a top wall 46, a bottom wall 48, opposed sidewalls 50 and 52, respectively, and a back wall 54. As shown in FIG. 5, the top wall 46 extends aft beyond the back wall 54 and forms a pair of spaced-apart rear mounting tabs 56 and 58 which have rear mounting holes 60 therein. Stiffeners 62 extend between the back wall 54 and the extended portion of the top wall 46. Raised front mounting bosses 64 with front mounting holes 65 extend upwards from the top wall 46. A security bracket 66 having a hole 68 therein is disposed on each side of the opening 44, and one or more locking bosses 69 are disposed on the top wall 46 adjacent the opening 44. A slot 70 is formed in the front edge of the top wall 46 between the locking bosses 69. Spaced-apart hinge members 72 are disposed on the bottom wall 48 adjacent the opening 44. In the illustrated example, all or part of the housing 42 is translucent or transparent, that is, non-opaque, to a sufficient degree to allow viewing of the life vest 40 inside, and also to discourage theft of the life vest 40, since it would be immediately obvious if it were missing from the housing 42. However, if desired, all or part of the housing 42 may be made opaque.

A rigid cover 74 is attached to the housing 42 so that it can swing between an open position and a closed position. The cover 74 is a generally planar, substantially rigid member constructed of plastic or similar material and has an outer face 76 and an inner face 78. An upstanding outer ridge 80 extends around the perimeter of the outer face 76 and serves to stiffen the cover 74, while an upstanding inner ridge 82 extends around the perimeter of the inner face 78 and serves to help locate the cover 74 in the closed position. Hinge members 84 complementary to the hinge members 72 of the housing 42 are disposed along the bottom edge of the cover 74. A tongue 86 having some degree of flexibility extends rearward from the top edge of the cover 74. Locking slots 88 are formed through the tongue 86 and positioned to align with the locking bosses 69. A security tab 90 is disposed on each side of the opening 44. A hole 92 is formed through each of the security tabs 90 and positioned to align with the hole 68 in the corresponding security bracket 66. The cover 74 may be partially or fully transparent as described above with respect to the housing 42.

The cover 74 is attached to the housing 42 by aligning their respective hinge members 84 and 72 and then passing one or more hinge pins 94 through the hinge members 84 and 72. The hinge pins 94 are then fixed in place, for example by sonic welding them to the hinge members 72 of the housing 42. In the closed position, shown in FIG. 1, the tongue 86 snaps over the top wall 46 of the housing 42 and the locking slots 88 engage the locking bosses 66. The inner ridge 82 protrudes into the opening 44 to align the cover 74 with the housing 42 and to discourage tampering. Seals 96, such as frangible plastic straps, may be placed through the mating holes 68 and 92 of the security brackets 66 and security tabs 90, respectively.

Figure 6:
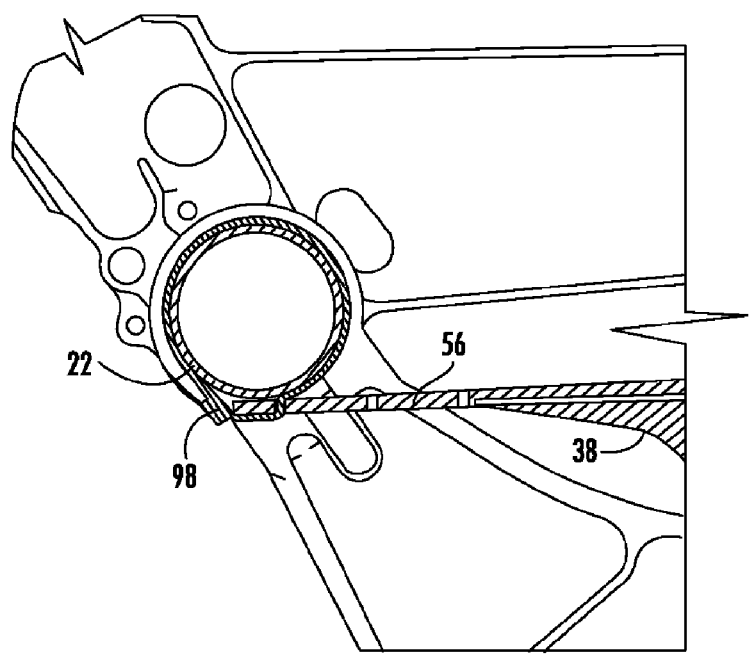
FIG. 6 is a side view of the rear portion of a life vest container mounted to a seat frame.
Figure 7:
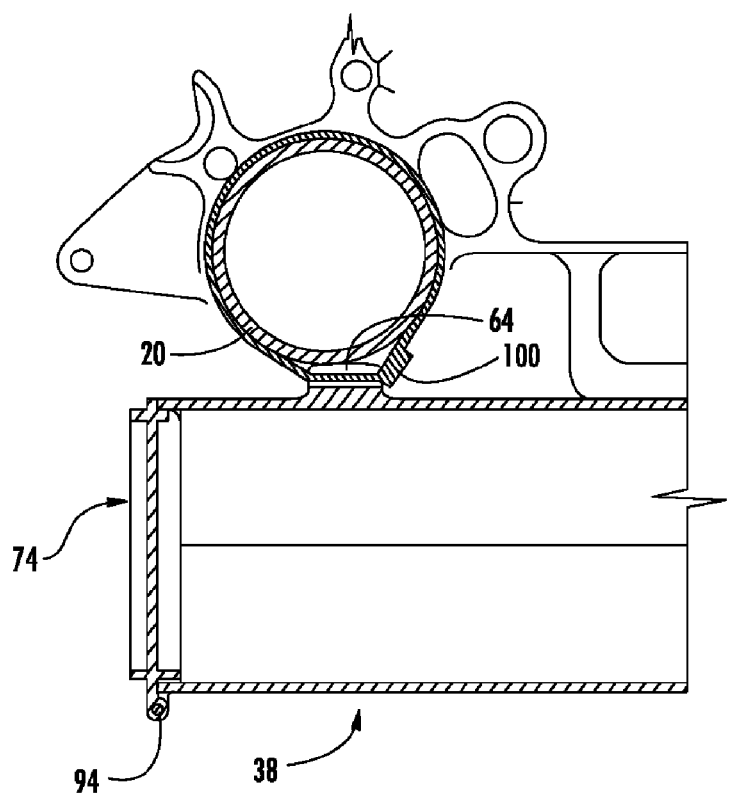
FIG. 7 is a side view of the front portion of a life vest container mounted to a seat frame.

FIGS. 6 and 7 illustrate how the life vest container 38 may be mounted to the aircraft seat set 10. It is noted that the exact location and the particular mounting method is not critical to the operation of the present invention and may be altered as desired to suit a particular application. The rear mounting tabs 56 and 58 are placed against the aft beam 22. Rear mounting straps 98 are then passed through the rear mounting holes 60, around the aft beam 22, and pulled tight. The rear mounting straps 98 may be similar to plastic cable ties of a known type. The front mounting bosses 64 are placed against the front beam 20. Front mounting straps 100 of the same type as the rear mounting straps 98 are then passed through the front mounting holes 65, around the front beam 20, and pulled tight. Using this mounting method, the packing and sealing of the life vest container 38 is completely independent from its mounting to the seat set 10. It is therefore possible to pre-package containers 38 with life vests, and to seal and inspect them, and then mount them in the aircraft with minimal labor and cost.

Figure 8:
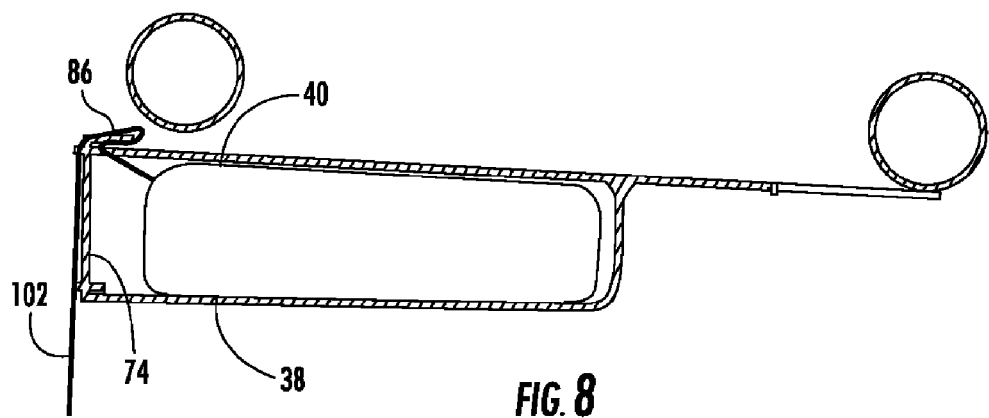
FIG. 8 is a side cross-sectional view of the life vest container mounted to the seat frame.
Figure 9:
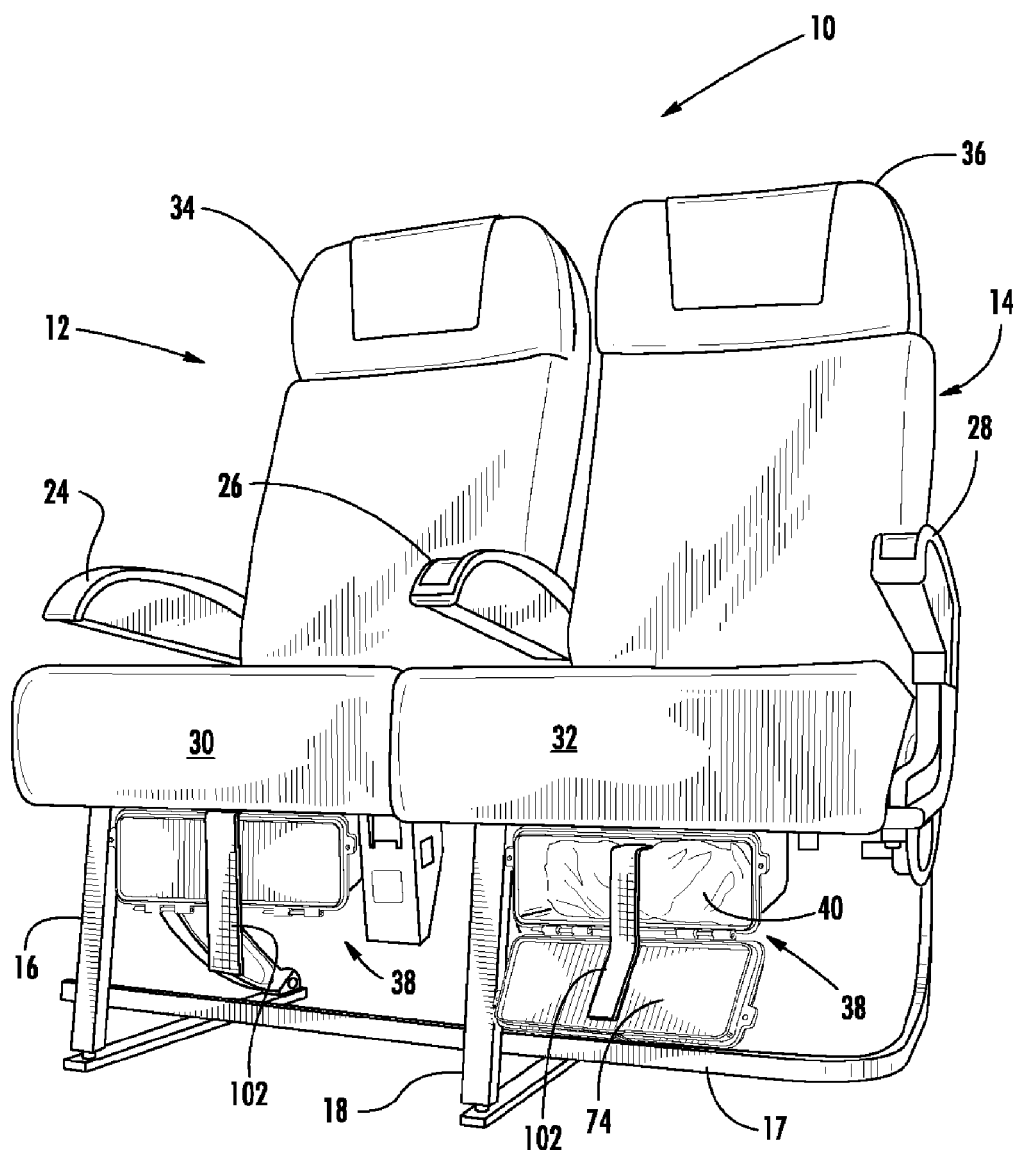
FIG. 9 is a perspective view of a seat set including a life vest container assembly with its cover in an open position.

In use, the cover 74 is opened by pulling upwards on the tongue 86 to disengage the locking bosses 69, and then outwards (forwards relative to the seat 12) to break the seals 96. As shown in FIG. 8, a deployment strap 102, attached to the life vest 40, may be routed through the slot 70, over the tongue 86, and then forward. When the deployment strap 102 is pulled, it will apply a force which both deflects the tongue 86 upwards to disengage the locking bosses 69 and pulls the cover 74 outwards. In either case, the cover 74 will freely pivot downwards through 180 degrees, as shown in FIG. 9. In this position, there is free access to the life vest 40 stored in the housing 42, and the cover 74 does not impede egress from the seat 12.

The foregoing has described a secure life vest container assembly including a hollow container, and a cover attached to the container with a tamper-evident sealing material. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation—the invention being defined by the appended claims.

What is claimed is:
1. A life vest container, comprising:
a hollow housing defining a storage volume adapted to receive a flotation device, said housing having an opening communicating with said storage volume, wherein said housing is a molded plastic one-piece assembly having a top wall, a bottom wall, spaced-apart side walls, and a rear wall;
said top wall extends past said rear wall to define at least one rear mounting tab having an opening therethrough;
at least one front mounting boss having a hole therethrough extends upwards from said top wall;
a security boss having a first hole therethrough carried by said housing;
a cover attached to said container and moveable between a closed position in which it encloses said opening, and an open position in which said opening is accessible;
a security tab having a second hole therethrough carried by said cover, wherein said second hole aligns with said first hole so as to receive a security seal therethrough for securing said cover in a closed position; and
means for attaching said housing to a passenger seat;
wherein at least a portion of said housing or said cover is sufficiently light-transmissive to allow observation of the condition of a flotation device disposed within said storage volume.

2. The life vest container of claim 1, wherein said cover includes a rearwardly-extending tongue which overlies said top wall in said closed position.

3. The life vest container of claim 2 wherein one of said housing and said tongue includes a locking slot formed therethrough; and
the other of said housing and said tongue includes a protruding locking boss formed therein, said locking boss adapted to engage said locking slot to retain said cover in a closed position.

4. The life vest container of claim 2 further comprising: a flotation device disposed inside of said container, said flotation device having an elongated deployment strap attached thereto;
wherein said deployment strap is routed through said housing and over said tongue so as to apply an upwards and outwards force to said cover tongue when said deployment strap is pulled.

5. The life vest container of claim 1 wherein said housing and said cover comprise transparent polycarbonate material.

6. The life vest container of claim 1 wherein said container is adapted to be mounted to a passenger seat when said cover is in said closed position.

7. A passenger seat frame assembly, comprising:
at least two spaced-apart leg modules;
spaced-apart forward and aft transverse beams extending laterally between said leg modules, said beam having an external surface; and
a life vest container attached to said seat frame, said life vest container comprising:
a hollow housing defining a storage volume, said housing including a top wall and having an opening communicating with said storage volume; and
a cover attached to said container and moveable between a closed position in which it enclosing said opening, and an open position in which said opening is accessible, said cover including a rearwardly-extending tongue which overlies said top wall in said closed position;
means for securing said cover in said closed position;
wherein at least a portion of said housing or said cover is sufficiently light-transmissive to allow observation of the contents of said storage volume.

8. The seat frame assembly of claim 7, wherein said housing is a molded plastic one-piece assembly having said top wall, a bottom wall, spaced-apart side walls, and a rear wall;
said top wall extends past said rear wall to define at least one rear mounting tab having an opening therethrough;
at least one front mounting boss having a hole therethrough extends upwards from said top wall.

9. The seat frame assembly of claim 8 further including:
a security boss having a first hole therethrough carried by said housing;
a security tab having a second hole therethrough carried by said cover, wherein said second hole aligns with said first hole; and
a security seal passing through said first and second holes.

10. The seat frame assembly of claim 8 wherein said housing and said cover comprise transparent polycarbonate material.

11. The seat frame assembly of claim 8 wherein said container is adapted to be mounted to said transverse beams when said cover is in said closed position.

12. The seat frame assembly of claim 7 wherein one of said housing and said tongue includes a locking slot formed therethrough; and
the other of said housing and said tongue includes a protruding locking boss formed therein, said locking boss adapted to engage said locking slot to retain said cover in a closed position.

13. The seat frame assembly of claim 7 further comprising: a flotation device disposed inside of said container, said flotation device having an elongated deployment strap attached thereto;
wherein said deployment strap is routed through said housing and over said tongue so as to apply an upwards and outwards force to said cover tongue when said deployment strap is pulled.

14. A life vest container, comprising:
a hollow housing defining a storage volume adapted to receive a flotation device, said housing having an opening communicating with said storage volume, said housing being a molded plastic one-piece assembly having a top wall, a bottom wall, spaced-apart side walls, and a rear wall; said top wall extending past said rear wall to define at least one rear mounting tab having an opening therethrough; and at least one front mounting boss having a hole therethrough extending upwards from said top wall;
a cover attached to said container and moveable between a closed position in which it encloses said opening, and an open position in which said opening is accessible; and
means for securing said cover in said closed position;
wherein at least a portion of said housing or said cover is sufficiently light-transmissive to allow observation of the condition of a flotation device disposed within said storage volume.

* * * * *